UNITED STATES PATENT OFFICE.

JAMES MACKAY, OF NEW YORK, N. Y.

COMPOSITION FOR THE HAIR.

Specification forming part of Letters Patent No. 2,541, dated April 6, 1842.

*To all whom it may concern:*

Be it known that I, JAMES MACKAY, of the city of New York and State of New York, have invented a new and useful preparation for effectually cleansing the dandruff from the head, preserving and beautifying the human hair; and I do hereby declare that the following is a full and exact description.

The ingredients are as follows: The liquor from carrots, rum or spirits, sweet-oil, and the oil of bergamot. The mode of preparing is in about the following proportions: To a half-pint of liquor (which may or may not be clarified) in which half a pound of carrots has been boiled till soft add one gill of rum or spirits, half a gill of sweet-oil, and twelve drops of the oil of bergamot.

The above I claim as my invention, and desire to secure the same by Letters Patent.

JAMES MACKAY.

Witnesses:
JOSEPH STEVENS,
DANL. STANBURY.